United States Patent
Gubler

(10) Patent No.: US 6,733,574 B2
(45) Date of Patent: May 11, 2004

(54) FILTER APPARATUS

(75) Inventor: Scott A. Gubler, St. George, UT (US)

(73) Assignee: Deseret Laboratories, Inc., St. George, UT (US)

( * ) Notice: Subject to any disclaimer, the term of this patent is extended or adjusted under 35 U.S.C. 154(b) by 90 days.

(21) Appl. No.: 10/120,743

(22) Filed: Apr. 11, 2002

(65) Prior Publication Data

US 2003/0192432 A1 Oct. 16, 2003

(51) Int. Cl.$^7$ .......................... B01D 46/00; B01D 46/42
(52) U.S. Cl. .......................... 95/273; 95/278; 55/284; 55/291; 55/293; 55/302; 55/341.1; 55/374; 55/378; 55/385.1; 55/422; 55/478; 55/481; 55/484; 55/502; 55/DIG. 46
(58) Field of Search .................... 55/284, 291, 293, 55/302, 341.1, 361, 362, 370, 374, 378, 385.1, 432, 478, 480, 481, 502, DIG. 46, 484; 95/273, 278, 280

(56) References Cited

U.S. PATENT DOCUMENTS

| | | | | |
|---|---|---|---|---|
| 1,761,377 A | * | 6/1930 | Waring | 55/378 |
| 1,797,812 A | * | 3/1931 | Waring | 55/341.1 |
| 4,046,526 A | | 9/1977 | Phillippi | |
| 4,198,216 A | * | 4/1980 | Wilhelmsson | 55/341.1 |
| 4,218,227 A | | 8/1980 | Frey | |
| 4,277,260 A | * | 7/1981 | Browning | 55/378 |
| 4,309,200 A | | 1/1982 | Heffernan | |
| 4,322,231 A | | 3/1982 | Hilzendeger et al. | |
| 4,331,459 A | | 5/1982 | Copley | |
| 4,336,035 A | | 6/1982 | Evenstad et al. | |
| 4,345,922 A | | 8/1982 | Grassel | |
| 4,395,269 A | | 7/1983 | Schuler | |
| 4,401,445 A | | 8/1983 | Browning | |
| 4,498,913 A | | 2/1985 | Tank et al. | |
| 4,645,520 A | | 2/1987 | Hü | |
| 4,670,993 A | | 6/1987 | Dunaway et al. | |
| 4,738,696 A | | 4/1988 | Staffeld | |
| 4,861,353 A | | 8/1989 | Wyss | |
| 4,953,308 A | | 9/1990 | Basten et al. | |
| 5,017,200 A | | 5/1991 | Price et al. | |
| 5,115,578 A | | 5/1992 | Basten | |
| 5,171,339 A | | 12/1992 | Forsten | |
| 5,251,384 A | | 10/1993 | Olsen et al. | |
| 5,320,657 A | | 6/1994 | Adams | |
| 5,446,974 A | * | 9/1995 | Gubler | 55/304 |
| 5,695,536 A | * | 12/1997 | Fabrizi | 55/422 |
| 5,993,519 A | * | 11/1999 | Lim et al. | 55/422 |

FOREIGN PATENT DOCUMENTS

| | | |
|---|---|---|
| JP | 110766/1976 | 9/1976 |
| JP | 128717/1985 | 8/1985 |
| JP | 243511/1992 | 8/1992 |

* cited by examiner

Primary Examiner—Duane Smith
Assistant Examiner—Jason M. Greene
(74) Attorney, Agent, or Firm—Holme Roberts & Owen LLP

(57) ABSTRACT

A filter apparatus for use with a fluid bed processor includes a movable filter bundle that can be selectively moved within a fluid bed chamber. The movable filter bundle includes one or more filters attached to corresponding filter mounts on a support structure. The movable filter bundle may also include an index rod that rotationally secures the movable filter bundle when in a first position. A support assembly can be used to connect the movable filter bundle to the fluid bed chamber. In the first position air is filtered through the filters in the process operation of the filter apparatus. In a second position individual filters on the movable filter bundle can be easily inspected, serviced, and/or replaced.

27 Claims, 5 Drawing Sheets

FILTER APPARATUS

BACKGROUND OF THE INVENTION

1. The Field of the Invention

The present invention relates generally to fluid bed granulators, coaters and dryers. In particular, the invention relates to a filter apparatus including a movable filter bundle that can be selectively raised and lowered to facilitate maintenance of one or more filter units on the movable filter bundle.

2. The Relevant Technology

Granulation is a crucial stage in many industries, such as mineral processing, agricultural products, detergents, pharmaceuticals, foodstuffs, and specialty chemicals. It is a size enlargement process where fine powder feed particles are bound together to form agglomerates or granules, a process that, for example, enables the formation of tablets. One type of granulation, wet granulation, is a process where the particles are bound together by a fluid (also called a binder) which forms liquid bridges between the particles to hold them together. The binding fluid is usually a solvent, like water or ethanol, or a solution of a polymeric binder in a solvent.

A fluid bed granulator is a tall cylindrical or rectangular vessel containing a bed of particles. Air is forced through a distributor at the base which fluidizes and agitates the powder. A binding fluid is added by spraying from above, below, or within the powder bed. These binder drops collide with the powder particles and form liquid bridges, which hold them together by capillary suction. By heating the fluidizing air, the product can be granulated and dried simultaneously, which is particularly useful in the specialty chemical and pharmaceutical industries.

As a result of the processes, fluid bed granulators, coaters, and dryers create a large amount of dust that fills the process air used therein. In order to prevent the release of this dust to the environment these devices therefore require the use of filter systems.

One such filter system is a bag filter system as illustrated in U.S. Pat. No. 5,446,974 to Gubler, herein incorporated by reference. The Gubler patent discloses a filter assembly having a cylindrical fluid bed chamber wherein the process air enters from one end, is filtered by one or more bag filters, and exits the opposite end. The bag filters are rigidly attached to a mounting plate within the filter plenum during operation and are unattached and removed from the filter assembly for servicing.

The individual bag filters disclosed in the Gubler patent comprise flexible filter bags that are fitted over and clamped onto underlying rigid frames. During operation, the filter bags form around and through side bars of the rigid frame in an accordion shape. Periodic cleaning of the filter bags is achieved by applying a periodic pulse of reverse air to the bag filter, forcing the filter bag outward from the rigid frame and dislodging particulate matter that has accumulated on the filter bag. Although this is remarkably effective, the filter bag must be eventually removed and cleaned or replaced.

Of course, a variety of other filter assemblies, filters, and bag filters exist that can also be effectively used to filter process air. With each of these filter systems the degree of difficulty in cleaning or replacing a filter in a fluid bed system can increase costs and limit the operational time of the filter system and its corresponding fluid bed system.

SUMMARY OF THE INVENTION

The present invention relates generally to a filter apparatus for use with a fluid bed processor. The filter apparatus generally includes a fluid bed chamber, a filter mount transport mechanism within the fluid bed chamber, and a filter mount for receiving a filter. The filter mount transport mechanism typically has one or more filters attached to corresponding filter mounts on a support structure. The filter mount transport mechanism may also include an index rod that rotationally secures the filter mount transport mechanism when in the operational position. For example, in one embodiment of the invention, in a first position air is filtered through the filters in the process operation of the filter assembly and in a second position individual filters on the filter mount transport mechanism can be easily inspected, serviced, and/or replaced.

According to one embodiment of the invention the filter mount transport mechanism further comprises at least one filter unit to form a movable filter bundle. One preferred filter unit includes a rigid frame, flexible filter media positioned relative to the frame so that the flexible filter media extends at least partially through openings in the frame and into the rigid frame when the filter unit has process air flowing therethrough, and a mechanism to secure a portion of the flexible filter media to the rigid filter frame. This embodiment of the invention also may include a cleaning mechanism, intermediate to the outlet opening, for removing particulate matter accumulated on the flexible filter media by causing the flexible filter media to momentarily flex outwardly from the rigid frame such that the flexible filter media extends substantially outside the openings. One such cleaning mechanism is a blow down tube.

According to another embodiment of the invention the filter mount transport mechanism further comprises an index rod. In this embodiment the filter apparatus also further comprises at least one index rod receiver, such as a tube or ring, attached to the fluid bed chamber. The index rod receiver is configured to receive the index rod and thereby rotationally secure the filter mount transport mechanism in a desired orientation while in the first position. Preferably, the number of index rod receivers equals the number of filter units to ensure a desired alignment between the filter units and other elements of the filter assembly, such as blow down tubes.

One method for servicing a filter in a fluid bed system according to the invention comprises first providing a fluid bed chamber within a filter apparatus, the fluid bed chamber having a movable filter bundle in a first position within the fluid bed chamber, the movable filter bundle having at least one filter attached thereto. Optionally, a portion of the fluid bed chamber is swung outward away from the fluid bed system and a product container is removed, thereby creating a filter servicing open space. The movable filter bundle is then moved to a second position within the fluid bed chamber. In this second position the filter is inspected, serviced, and/or replaced.

According to one aspect of this embodiment of the invention, the first position comprises a raised position within the fluid bed chamber wherein the filter apparatus can be operational to filter process air and the second position comprises a lowered position within the fluid bed chamber wherein the at least one filter can be easily accessed for service.

Servicing the filter can comprise refurbishing a reusable bag filter unit by removing the filter unit from the movable filter bundle, removing the bag filter media from a substantially rigid frame, applying a different bag filter media to the substantially rigid frame, thereby refurbishing the filter, and attaching the refurbished filter to the movable filter bundle.

Alternatively, the method can comprise simply changing filters by removing a filter from the movable filter bundle and attaching a different filter to the movable filter bundle. Yet another embodiment involves replacing the bag filter media on an underlying rigid frame that remains attached to the filter mount transport mechanism.

These and other features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered as limiting of its scope, the invention will be described and explained with additional specificity and detail through the use of accompanying drawings in which.

DETAILED DESCRIPTION OF THE INVENTION

The present invention relates to improved filter assemblies for use with fluid bed systems. The assemblies generally comprise a filter mount transport mechanism that can be selectively moved to first and second positions, for example raised and lowered positions, within a fluid bed chamber. In the first position air is filtered through filters attached to the filter mount transport mechanism in the process operation of the filter assembly. In the second position the individual filters can be quickly inspected, serviced, and/or replaced. Thus, filter assemblies in accordance with the present invention minimize the fluid bed system down time that is required to service filter assemblies.

Such filter assemblies in accordance with the present invention are easier to service than conventional filter assemblies because they require simpler and faster procedures for filter servicing. For example, it is often difficult to access filters in conventional filter assemblies and significant portions of the fluid bed system must often be disassembled in order to access the filters for servicing, whereas the filter assembly of the present invention has an easily accessible filter bundle when it is in the second position.

Additional advantages of the present invention will become readily apparent to those skilled in the art from the following detailed description, wherein currently preferred embodiments of the invention are shown and described in the disclosure. As will be realized, the invention is capable of other and different embodiments, and its several details are capable of modifications in various obvious respects, all without departing from the invention. Accordingly, the drawings and description are to be regarded as illustrative in nature, and not as restrictive.

In the following description, numerous specific details are set forth in order to provide a thorough understanding of the present invention. It will be obvious, however, to one skilled in the art that the present invention may be practiced without these specific details. In other instances, well known aspects of fluidized bed and filtering processes and machinery have not been described in particular detail in order to avoid unnecessarily obscuring the present invention.

It is to be understood that the drawings, wherein like structures are provided with like reference designations, are diagrammatic and schematic representations of embodiments of the present invention and are not necessarily drawn to scale. In addition, the drawings only show the structures necessary to understand illustrations of the present invention. Additional structures known in the art have not been included to maintain the clarity of the drawings.

Figure 1:
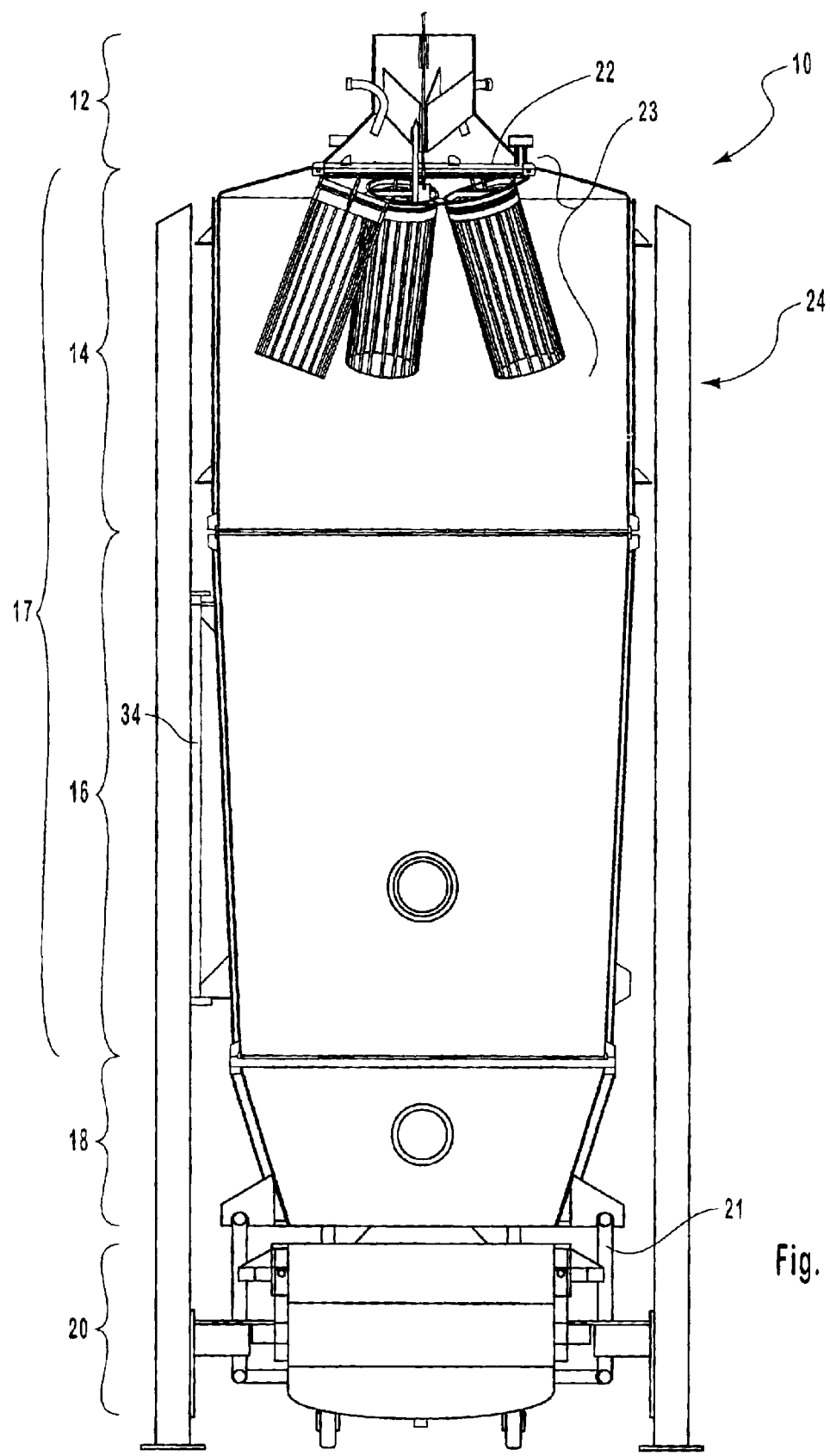
FIG. 1 is a filter assembly according to one embodiment of the invention.

Referring now to the drawings, wherein like structures are provided with like reference designations, FIG. 1 depicts one embodiment of a fluid bed system 10. For example, and not by way of limitation, fluid bed system 10 can be conceptually divided into one or more regions or chambers. The illustrated embodiment shows five such regions: exhaust plenum 12, filter housing chamber 14, expansion chamber 16, product container 18, and inlet plenum 20. At times it will also be useful to refer to fluid bed chamber 17, which includes both filter housing chamber 14 and expansion chamber 16. These regions will be discussed in further detail hereinbelow, although some regions relate more to the present invention than others and will therefore receive more discussion.

Inlet plenum 20 is the location where process air enters fluid bed system 10 and is directed upwards towards filter housing chamber 14. The process air is used to maintain particulate matter in the fluid bed system in a fluidized state.

Product container 18 is a conical chamber where at least a portion of the fluidized bed is located while the fluid bed system 10 is in operation. When fluid bed system 10 is not in operation, product granules settle out of the fluidized state and are collected in the product container. According to one embodiment of the invention, product container 18 is attached to a movable cart 21 so that it can be quickly separated from fluid bed system 10, allowing removal of product granules that have accumulated in product container 18 and exposing an open space between inlet plenum 20 and fluid bed chamber 17.

After leaving product container 18, air travels upwards through expansion chamber 16, into filter housing chamber 14, and exits through exhaust plenum 12. In one embodiment a vacuum is formed within fluid bed system 10 by of a fan (not illustrated) located at the upper end of the fluid bed chamber 17. Also, the inlet for the bonding solution used in the granulating process is preferably located within expansion chamber 16.

Figure 2:
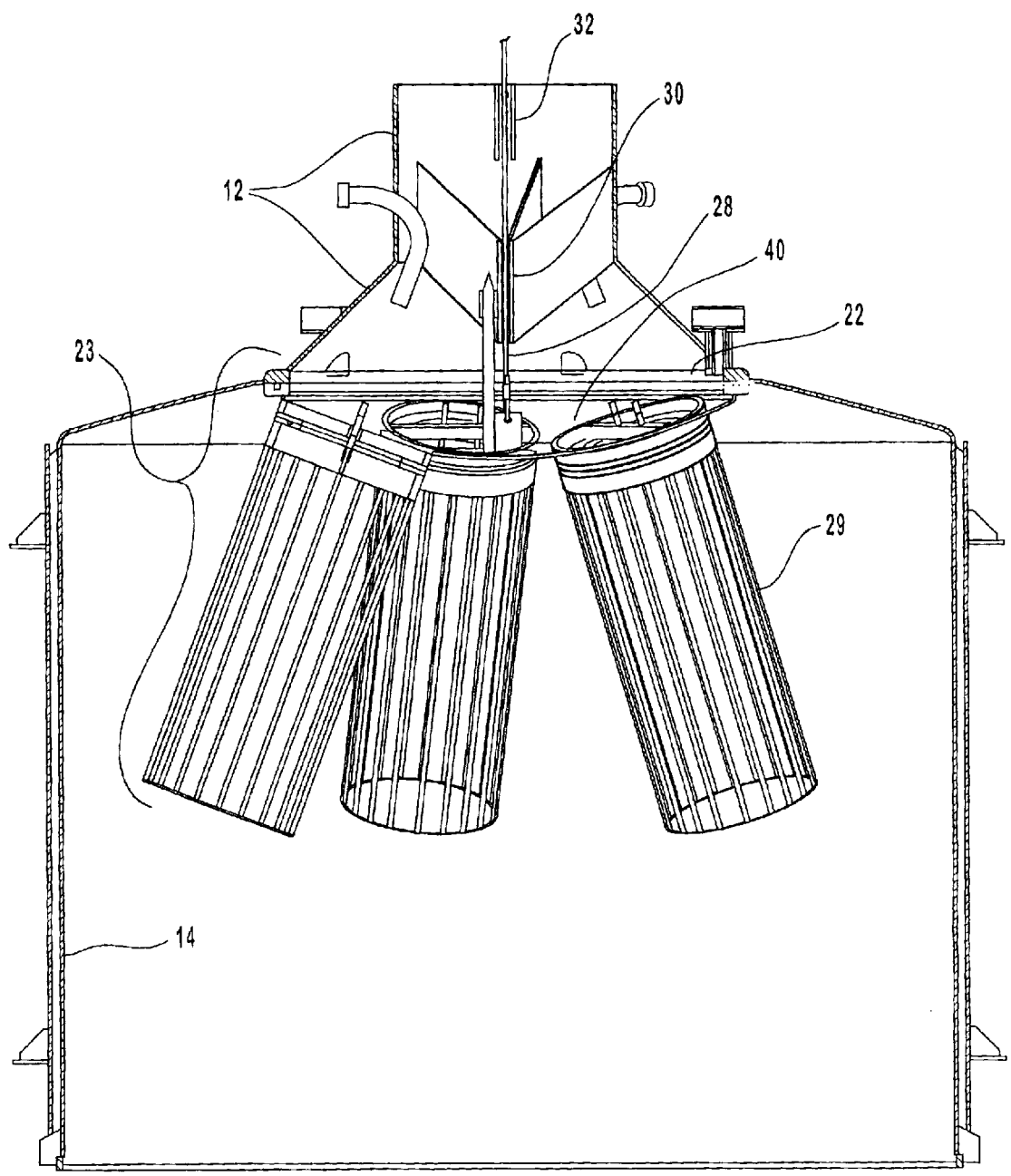
FIG. 2 is a view of component a filter assembly according to one embodiment of the invention.

As illustrated in greater detail in FIG. 2, within filter housing chamber 14 is filter mount transport mechanism 22. Filter housing chamber 14 is open to expansion chamber 16 below, and has an opening above, where filter mount transport mechanism 22 sealingly attaches.

Exhaust plenum 12, filter housing chamber 14, expansion chamber 16, product container 18, and inlet plenum 20 can each be formed of any of a variety of materials that do not easily corrode and do not react unfavorably with the materials used in the granulating. By way of non-limiting example, stainless steel and plastic are often suitable, as well as combinations of stainless steel, plastic, and other non-corrosive materials. In addition, one skilled in the art will recognize that the details presented herein with respect to exhaust plenum 12, filter housing chamber 14, expansion chamber 16, product container 18, and inlet plenum 20 are illustrative of a preferred embodiment only, and are not limiting of the invention.

FIG. 1 illustrates filter mount transport mechanism 22 (and movable filter bundle 23) in the first position 24. As used herein, the term "filter mount transport mechanism" describes a movable device, of which a filter may or may not be a part. Also as used herein, the term "movable filter bundle" is used to denote a filter mount transport mechanism 22 that includes one or more filters and that can be moved between two or more positions. Accordingly, in the first position 24, as illustrated in FIG. 1, the top surface of filter mount transport mechanism 22 is positioned at the intersection of filter housing chamber 14 and exhaust plenum 12 so that filter mount transport mechanism 22 is housed substantially within filter housing chamber 14.

Figure 3:
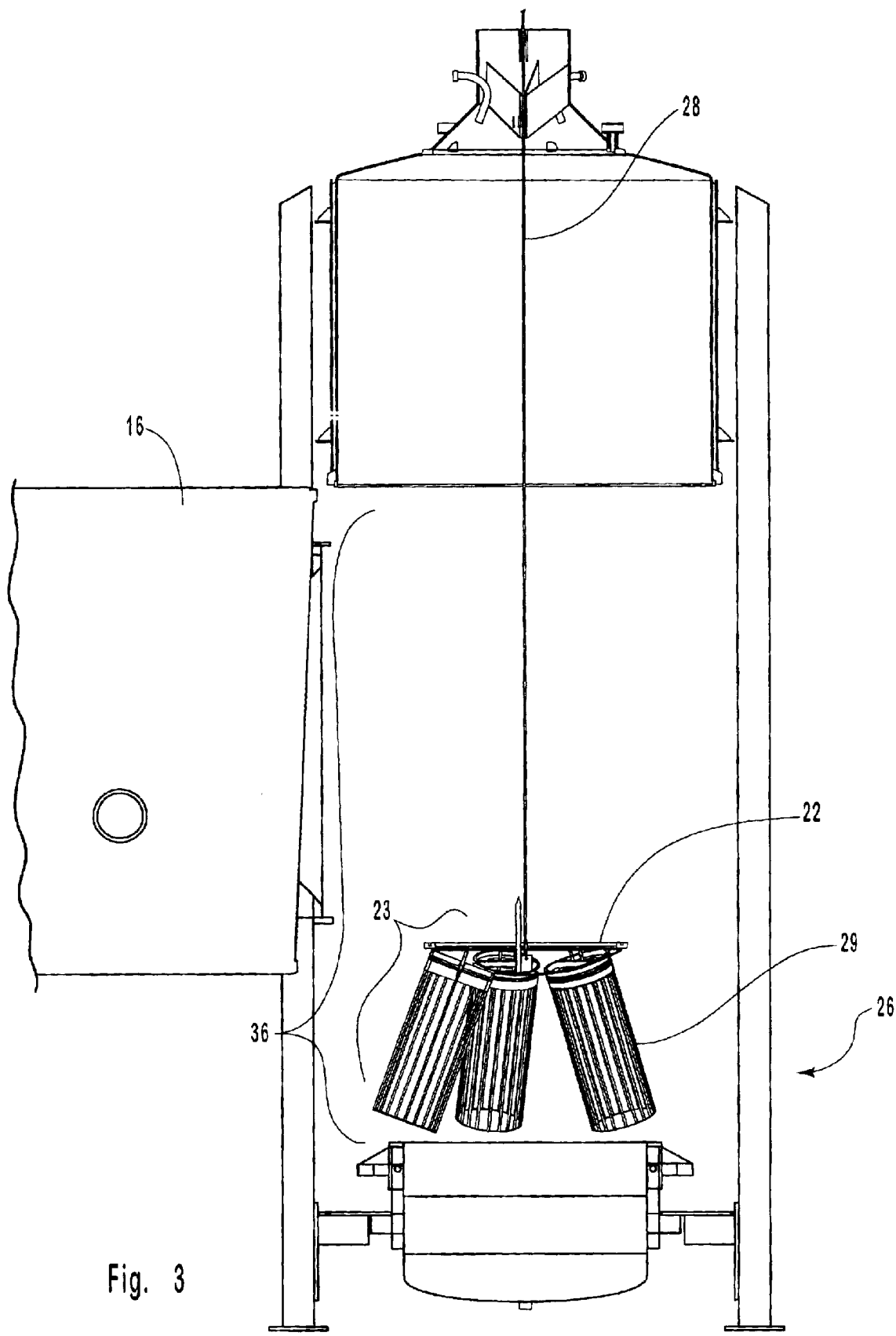
FIG. 3 is another view of a filter assembly according to one embodiment of the invention.

A support assembly is used to support filter mount transport mechanism 22 in either the first or second position. As illustrated in FIG. 3, the support assembly may comprise a cable 28 that is in communication with filter mount transport mechanism 22. Alternatively, by way of non-limiting example, the support assembly may comprise a belt, chain, rod, or other structure that permits movement of the filter mount transport mechanism 22 between the first and second positions. In addition, a variety of devices can be used in conjunction with the support assembly to effectuate movement of filter mount transport mechanism 22, including pulleys, motors, cranks, and the like.

As also illustrated on FIG. 3, expansion chamber 16 can be swung away from fluid bed system 10 on a hinge 34, leaving an open space. In addition, product container 18 sits on cart 21, as illustrated in FIG. 1, and can be removed completely. The combination of swinging expansion chamber 16 away from fluid bed system 10 and removing product container 18 creates a filter servicing open space 36.

Thus, filter mount transport mechanism 22 can be selectively moved by support assembly to a first position 24 and a second position 26 so that the top surface of filter mount transport mechanism 22 is positioned either within filter housing chamber 14 (the first position) or within filter servicing open space 36 (the second position). Before filter mount transport mechanism 22 can be moved to second position 26, however, filter servicing open space 36 is formed by swinging expansion chamber 16 away from fluid bed system 10 and removing product container 18. The filter mount transport mechanism 22 is thereby made easily accessible to a filter assembly operator for filter servicing.

In the first position of the illustrated embodiment of FIG. 1, the filter assembly is in operational mode for filtering process air through the assembly whereas in the second position of FIG. 3 the filter assembly is in maintenance mode for maintaining and/or inspecting the filter units 29.

Compatible filters include both single-use and reusable filter units. Single-use filter units can be quickly and easily replaced whereas reusable filter units can be quickly and easily maintained by removing the spent filter units and either refurbishing them or replacing them with new or previously refurbished filter units.

One compatible reusable filter unit assembly is described in U.S. Pat. No. 5,446,974 to Gubler (hereinafter "the Gubler patent"), previously incorporated herein by reference. This filter unit assembly is described hereinbelow to provide a description of one compatible device. Nevertheless, one skilled in the art will appreciate that a variety of filter unit designs can be utilized with the present invention, including both removable and permanently attached filter units.

Accordingly, the Gubler patent discloses a filter unit assembly that generally comprises a rigid filter frame, a filter bag, a clamp, and a gasket. The rigid filter frame comprises a cylindrical device having a generally flat top, a flat bottom, and parallel filter frame rods between the top and the bottom. The filter top has a plate covering part of the filter top and a threaded rod that allows the filter frame to be attached to a mount on a filter assembly, such as filter mount 44 in FIG. 4. The top also has one or more openings to allow air to flow through the filter. The filter bottom is a solid plate that provides support for the filter frame rods. The filter frame rods have one end on the perimeter of the top plate and the other end on the perimeter of the bottom plate, allowing the side rods to form the shape of the side wall of the filter frame assembly. The filter frame is generally reusable and can be made of a variety of ridged materials, such as plastics, metals, hard rubber, and wood, so long as they are sturdy. Additionally, the filter frame can vary in size and shape to fit the required filtering applications.

The filter bag has an open top allowing the filter bag, during installation, to be pulled upward over the filter frame until the bottom media of the filter bag is tight against the filter bottom plate. The filter bag has numerous pleats to allow the filter bag to expand in the cleaning process and contract during normal operation. When process air is exerted against it during operation of the filter assembly, the filter bag forms around and through the rigid filter frame rods in a manner which provides increased filter surface area in a minimal space. During usage, particulate matter gradually coats the surface of the filter bag, rendering it less effective. Advantageously, when a pulse of reverse air flow is applied against the outlet side of the filter bag, it causes the bag to flex outward away from the filter frame, thereby discharging the coated particles off the outer fabric. This can be done without stopping the filtering process. Eventually, the filter bags of the Gubler patent can be removed from the frame and washed in a washing machine to clean before reusing.

The clamp holds the filter bag in place at the top of the filter assembly. The clamp tightens around the perimeter of the filter frame and filter bag causing the filter bag to be held in a fixed position at the top of the filter assembly. A gasket is also employed to ensure the filter assembly forms a tight seal against the filter mount.

One reason the Gubler filter bags are advantageous is that they can be changed in minutes whereas many other conventional filter bag systems can take several hours to change. Thus, the combination of the presently disclosed movable filter bundle 23 with the Gubler filter bags provides an even quicker filter maintenance system. Nevertheless, other conventional filter designs, both reusable and single-use, are compatible with the movable filter bundle 23 of the present invention.

Figure 4:
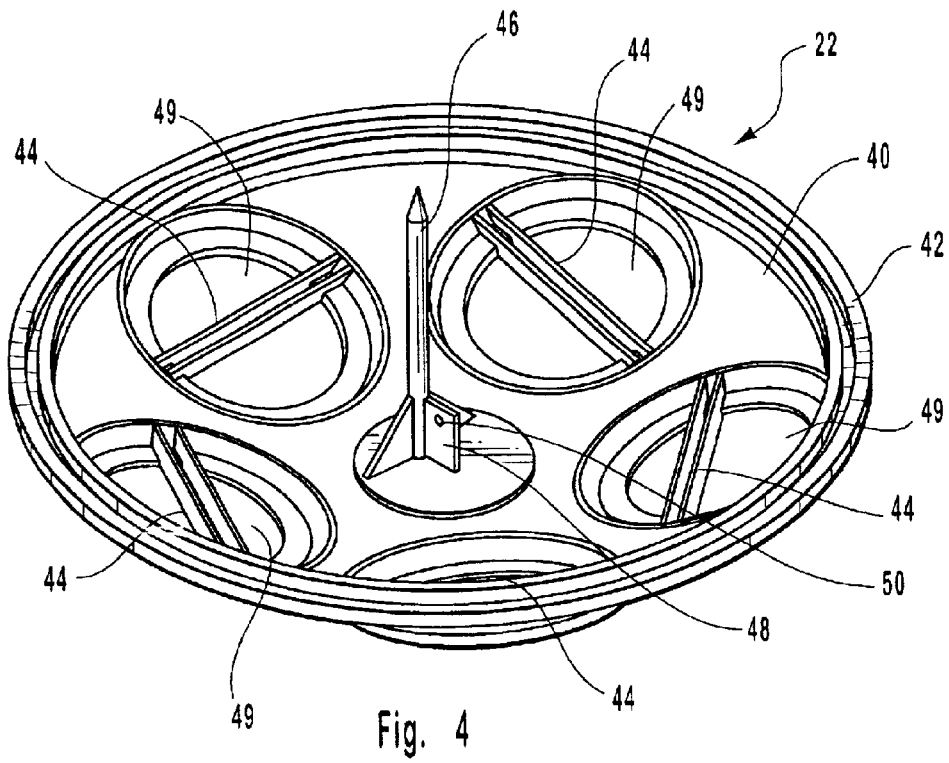
FIG. 4 is a view of another component of a filter assembly according to one embodiment of the invention.

Referring now to FIG. 4, according to one embodiment of the invention filter mount transport mechanism 22 comprises a support structure 40 that serves as a unifying member of filter mount transport mechanism 22, connecting each of seal 42, filter mounts 44, index rod 46, and attachment block 48 into a cohesive unit. The particular configuration of support structure 40 is not critical, so long as it provides adequate strength to support the weight of the various components of filter mount transport mechanism 22 and prevents the passage of air except through openings 49 in filter mounts 44. As with each of the components of the fluid bed system 10, support structure 40 can be formed of any suitable material that does not corrode while in contact with process materials. For example, suitable materials may include stainless steel, plastic, other non-corrosive materials, and combinations thereof.

The particular design of filter mounts 44 will vary depending on the particular filter unit used, but may comprise, for example, a filter receiving member comprising a threaded bore for receiving a threaded screw on a filter unit. Alternatively, filter mounts 44 can be permanently attached to at least a portion of the corresponding filters so that only part of each filter, such as the filtering media, is removed for filter servicing. Although five filter mounts are depicted in FIG. 3, one skilled in the art will recognize that the number of mounts can be altered to accommodate the filtering requirements of the filtering assembly. For example, one, two, three, four, or six mounts may also be used.

Figure 5:
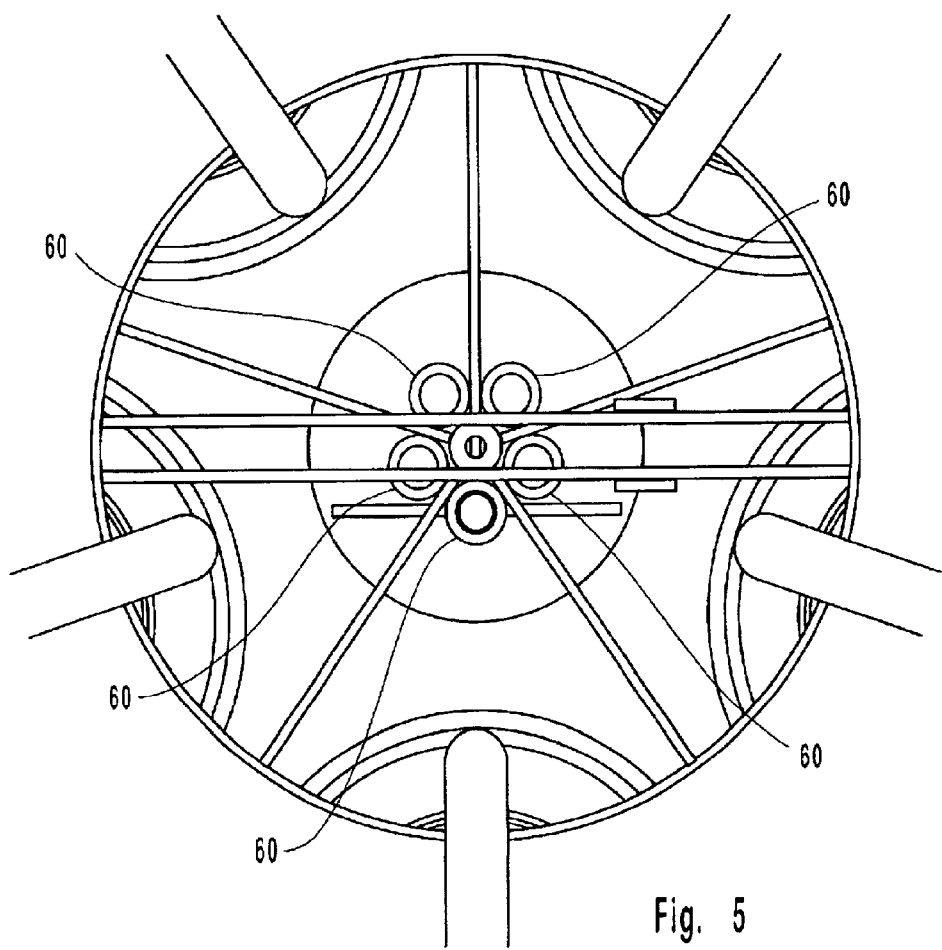
FIG. 5 is a view of yet another component of a filter assembly according to one embodiment of the invention.

Index rod 46 and attachment block 48 illustrate two embodiments of elements to connect filter mount transport mechanism 22 to fluid bed system 10. Index rod 46 acts as a stabilizing rod that fixes filter mount transport mechanism 22 into a desired rotational position when in the first position 24 by mating with an index rod receiver 60 on fluid bed system 10, as depicted in FIG. 5. While in the lowered position index rod 46 is no longer mated with index rod receiver 60 so movable filter bundle 23 is not rotationally restricted. Thus, an operator can easily rotate movable filter bundle 23 to access the desired filter.

Figure 6:
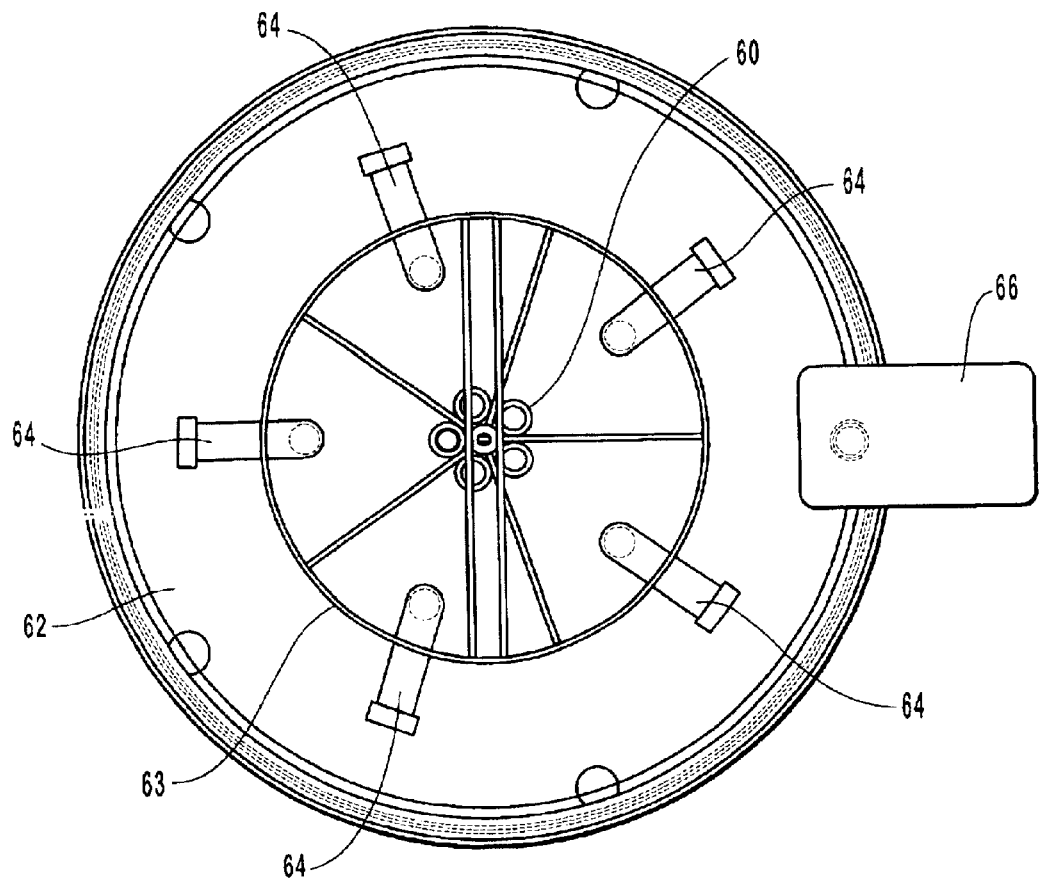
FIG. 6 is yet another view of a component of a filter assembly according to one embodiment of the invention.
Figure 7:
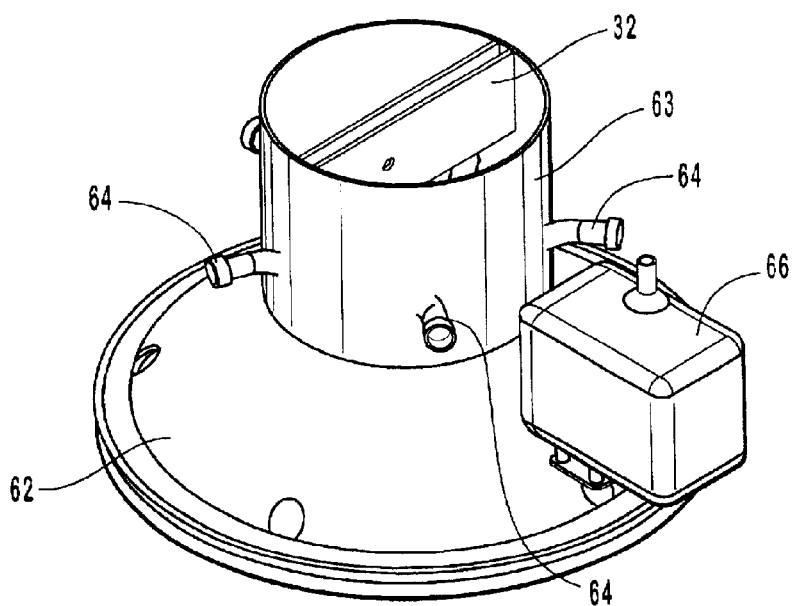
FIG. 7 is yet another view of a component of a filter assembly according to one embodiment of the invention.

FIG. 5 is a top view of fluid bed system 10 in FIG. 1. As illustrated therein, index rod receivers 60 comprise a series of openings configured in a circular pattern around a center axis. Preferably, the number of index rod receivers 60 is equal to the number of filter mounts 44 and filter units 29 so that regardless of which index rod receiver 60 is mated with index rod 46, each of filter mounts 44 and filter unit 29 are positioned in the desired orientation with respect to fluid bed system 10 and blow down tubes 64 as depicted in FIGS. 6 and 7.

Accordingly, index rod 46 is positioned off center from the center of filter mount transport mechanism 22 a distance corresponding to the distance from the center of a grouping of index rod receivers 60 to the center of one of index rod receivers 60. This enables index rod 46 and each of index rod receiver 60 to connect if they are in line as they are brought together.

Although index rod receiver 60 may comprise a plurality of tubes sized to fit index rod 46, the index rod receiver 60 may comprise rings or non enclosed structures, such as U-shaped members. The exact shape of the index rod receiver 60 is not critical, so long as they rotationally secure index rod 46, and thus movable filter bundle 23, in a desired position. Thus, the designs of the present invention are particularly advantageous in that it is not necessary for index rod 46 to be in any particular degree of rotation as it is raised to be inserted into one of the index rod receivers 60 because it will necessarily align with one of them.

According to one embodiment of the invention, as illustrated in FIGS. 1–4, attachment block 48 includes a cable attachment aperture 50 to which cable 28 attaches. The cable attachment aperture 50 is centered in the filter mount transport mechanism 22 so that it acts as a single support locus for the entire filter mount transport mechanism 22 and the weight is evenly distributed around the periphery thereof.

Of course, as discussed hereinabove the support assembly is not limited to a cable 28 but can comprise various other assemblies that can be used to raise and lower filter mount transport mechanism 22. Therefore, other structures than cable attachment aperture 50 and attachment block 48 can be used to provide a suitable assembly for attaching the support assembly to filter mount transport mechanism 22. A non-exclusive list of examples includes a clamp, a hook, and/or a plurality of support assembly attachment members located on a plurality of locations on filter mount transport mechanism 22.

Referring again now to FIG. 2, according to one embodiment of the invention, cable 28 is attached to attachment block 48 at cable attachment aperture 50 and passes through cable guide tube 30, located on exhaust plenum 12. The cable 28 passes through pulley mount 32 to a corresponding pulley (not illustrated) positioned thereon. The cable 28 can be attached to the pulley, which has a motor, crank, or other device acting thereon. Alternatively, cable 28 can extend above pulley mount 32 and exhaust plenum 12 for attachment to a motor, crank, or other device outside exhaust plenum 12.

FIG. 6 is a top view of exhaust plenum 12 and FIG. 7 is a perspective view of exhaust plenum 12. The exhaust plenum 12 comprises a dome section 62 and a cylindrical section 63 attached thereover. A plurality of blow down tubes 64 are attached to cylindrical section 63. Blow down tubes 64 are in communication with additional tubing and a blower system (not illustrated) that coordinates sequential blow downs to each of blow down tubes 64 on a predetermined timing schedule. The positioning of blow down tubes 64 is preferably such that when index rod 46 is mated with one of index rod receivers 60, each blow down tube aligns with one of the filters attached to filter mount transport mechanism 22.

The purpose of aligning filter units 29 with blow down tubes 64 is so that fluid bed system 10 has the ability to periodically clean itself of blinding process material. This is performed by applying a pulse of reverse air through blow down tubes 64 to the outlet side of each filter unit 29, causing the filter bag to flex outward from the center of the assembly frame. This pulse of air serves to dislodge blinding particles that have accumulated on filter units 29 as described hereinabove. This is preferably done in an alternating manner so that only one filter is subject to the pulse of reverse air at any given time. The timing of the air pulses is triggered by an automatic periodic timing device that coordinates with a valve manifold.

Actuator 66 is attached to either the upper lip of filter housing chamber 14 or directly to dome section 62. According to one embodiment of the invention, actuator 66 coordinates with filter mount transport mechanism 22 and exhaust plenum 12 to ensure that seal 42 forms a tight seal between filter mount transport mechanism 22 and exhaust plenum 12.

Accordingly, one preferred method of operating the invention is as follows. First, a filter apparatus as described hereinabove is provided with a fluid bed chamber within the filter apparatus. A movable filter bundle, having at least one filter attached thereto, is provided in a first position within the fluid bed chamber. The first position within the fluid bed chamber is one wherein the filter apparatus can be operational to filter process air and a second position is one wherein at least one filter on movable filter bundle 23 can be easily accessed for service. Although it is preferred that the first position be an elevated position and the second position be a lowered position, one skilled in the art will recognize that the first and second positions can be in different relations to each other, such as horizontal to each other or with the second position being the raised position. Nevertheless, for purposes of simplicity only the embodiment having the first position elevated with respect to the second position is further referred to herein.

For servicing, the process air entering the filter apparatus is stopped and the expansion chamber 16 is swung on hinge 34 to the open position and cart 21 is removed along with product container 18. As a result, filter servicing open space 36 is formed. Movable filter bundle 23 is then moved to the second position within filter servicing open space 36. In this manner, movable filter bundle 23 is made readily accessible to an operator and the filter(s) can be inspected, serviced, and/or replaced.

According to one embodiment of the invention the at least one filter is a filter unit that can be selectively attached and removed from the movable filter assembly. Thus, after the movable filter assembly is lowered, the filter unit is removed from the movable filter assembly and a new or refurbished filter unit is attached. This is repeated for each filter on movable filter bundle 23.

In those embodiments wherein support assembly incorporates a flexible cable 28, movable filter bundle 23 is freely rotatable in the lowered position. Thus, an operator of fluid bed system 10 can rotate movable filter bundle 23 to sequentially remove and attach the respective used and new filters.

According to one embodiment of the invention, the filter comprises a filter unit having a rigid frame with a plurality of openings and a filter media covering the plurality of openings. One example of such a filter is described in the Gubler patent, incorporated hereinabove by reference. The steps to replacing such a filter preferably include removing the at least one filter from movable filter bundle 23, removing the filter media from the substantially rigid frame, applying a different filter media to the substantially rigid frame, thereby refurbishing the filter, and attaching the refurbished filter to movable filter bundle 23. Alternatively, such a filter can be serviced by removing and replacing the filter media while the underlying rigid frame remains attached to the filter mount transport mechanism.

After the replacement of all the filters is completed, the support assembly is moved, thereby raising movable filter bundle 23 to the first position. In this position index rod 46 is mated with any of the index rod receiver 60 on exhaust plenum 12, thus rotationally securing movable filter bundle 23 for operation.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A filter apparatus for filtering process air generated by a fluid bed granulator, coater, or dryer comprising:

a fluid bed chamber;

a filter mount transport mechanism, the filter mount transport mechanism including at least one filter mount for receiving a filter, the filter mount transport mechanism having:

a first position wherein the filter mount is in position for filtering process air; and a second position wherein the filter mount is in position for filter servicing;

an index rod; and an index rod receiver, said index rod receiver adapted to receive the index rod, thereby placing the filter mount transport mechanism in a desired rotational position while in the first position.

2. The apparatus of claim 1, wherein the filter mount transport mechanism further comprises a support structure and a seal to prevent process material from bypassing the filter mount transport mechanism.

3. The apparatus of claim 1, further comprising a support assembly attached to the fluid bed chamber and the filter mount transport mechanism for selectively raising and lowering the filter mount transport mechanism within the fluid bed chamber.

4. The apparatus of claim 1, further comprising at least one filter for filtering process air used by a fluid bed granulator, coater, or dryer.

5. The apparatus of claim 4, wherein the at least one filter comprises:

a rigid frame having a housing framework, an outlet opening, and numerous openings;

flexible filter media positioned relative to the framework so that the flexible filter media extends at least partially through the openings into the rigid frame when the filter unit has process air flowing therethrough; and a clamp to secure a portion of the flexible filter media to the rigid filter frame.

6. The apparatus of claim 5, wherein the filter apparatus further comprises a cleaning mechanism, adjacent to the outlet opening, for removing particulate matter accumulated on the flexible filter media by causing the flexible filter media to momentarily flex outwardly from the rigid frame such that the flexible filter media extends substantially outside the openings.

7. The apparatus of claim 5, wherein the flexible filter media comprises a pleated flexible filter bag.

8. The apparatus of claim 1, further comprising at least one filter unit and wherein the number of index rod receivers equals the number of filter units.

9. The apparatus of claim 1, further comprising three filter mounts.

10. The apparatus of claim 1, further comprising five filter mounts.

11. The apparatus of claim 4, further comprising:

a support structure and a seal to prevent process material from bypassing the filter mount transport mechanism; and a removable clamp to secure the at least one filter to the support structure in order to minimize the time necessary to exchange one filter for another.

12. The apparatus of claim 4, wherein the filter is attached to the filter mount by a threaded rod.

13. The apparatus of claim 4, further comprising a seal located between the filter and the support structure to prevent process material from bypassing the filter.

14. A filter apparatus for filtering process air generated by a fluid bed granulator, coater, or dryer comprising:

a fluid bed chamber;

a movable filter bundle within the fluid bed chamber, the movable filter bundle having a raised position and a lowered position, wherein in the raised position the movable filter bundle is in position for filtering process air and in the lowered position the movable filter bundle is in position for filter servicing, the movable filter bundle comprising:
a support structure;
a filter mount;
an attachment block;
an index rod; and
at least one filter unit for filtering process air generated by a fluid bed granulator, coater, or dryer, the filter unit having a fastening device to attach the filter unit to the filter mount;
a support assembly attached to the attachment block for selectively raising and lowering the movable filter bundle within the fluid bed chamber; and
at least one index rod receiver attached to the fluid bed chamber for receiving the index rod and thereby placing the movable filter bundle in a desired rotational position while in the raised position.

15. The apparatus of claim 14, wherein the number of index rod receivers equals the number of filter units.

16. The apparatus of claim 14, further comprising a seal located between the movable filter bundle and the fluid bed chamber to prevent process material from bypassing the movable filter bundle.

17. The apparatus of claim 4, further comprising at least one blow down tube, the number of blow down tubes equaling the number of filter units, the blow down tubes being configured so that each blow down tube is aligned with each filter unit when in the raised position.

18. A method of servicing filters in a filter apparatus, comprising:
providing a fluid bed chamber within a filter apparatus, the fluid bed chamber having a movable filter bundle in a first position within the fluid bed chamber, the movable filter bundle having at least one filter attached thereto, the filter mount transport mechanism being rotationally held in position when in the raised position by an index rod that is mated with an index rod receiver;
selectively moving the movable filter bundle to a second position, said filter mount transport mechanism being freely rotatable in said second position; and
servicing the at least one filter while in the second position.

19. The method of claim 18, wherein:
the first position comprises a raised position within the fluid bed chamber wherein the filter apparatus is operational to filter process air; and
the second position comprises a lowered position wherein the at least one filter can be accessed for service.

20. The method of claim 19, wherein:
when the movable filter bundle is in the lowered position at least a portion of the movable filter bundle is in a filter servicing open space.

21. The method of claim 18, wherein the filter comprises:
a substantially rigid frame having a plurality of openings; and
a filter media covering the plurality of openings.

22. The method of claim 21, wherein the step of servicing the filter comprises:
removing the at least one filter from the movable filter bundle;
removing the filter media from the substantially rigid frame;
applying a different filter media to the substantially rigid frame, thereby refurbishing the filter; and
attaching the refurbished filter to the movable filter bundle.

23. The method of claim 18, wherein the step of servicing the filter comprises:
removing the at least one filter from the movable filter bundle; and
attaching a different filter to the movable filter bundle.

24. The method of claim 21, wherein the step of servicing the filter comprises:
removing the filter media from the substantially rigid frame without removing the at least one filter from the movable filter bundle; and
applying a different filter media to the substantially rigid frame, thereby refurbishing the filter.

25. The apparatus of claim 1, wherein the index rod is attached to the filter mount transport mechanism and the index rod receiver is attached to the fluid bed chamber.

26. The method of claim 18, wherein the index rod is attached to the filter mount transport mechanism and the index rod receiver is attached to the fluid bed chamber.

27. A method of servicing filters in a filter apparatus, comprising:
providing a fluid bed chamber within a filter apparatus, the fluid bed chamber having a movable filter bundle in a first position within the fluid bed chamber, the movable filter bundle having at least one filter attached thereto;
said at least one filter comprising a substantially rigid frame having a plurality of openings, and a filter media covering the plurality of openings;
selectively moving the movable filter bundle to a second position; and
servicing the at least one filter while in the second position, said servicing comprising:
removing the filter media from the substantially rigid frame without removing the at least one filter from the movable filter bundle; and
applying a different filter media to the substantially rigid frame, thereby refurbishing the filter.

* * * * *

UNITED STATES PATENT AND TRADEMARK OFFICE
CERTIFICATE OF CORRECTION

PATENT NO. : 6,733,574 B2
DATED : May 11, 2004
INVENTOR(S) : Scott A. Gubler

It is certified that error appears in the above-identified patent and that said Letters Patent is hereby corrected as shown below:

Column 11,
Line 25, change "The apparatus of claim 4, further comprising at least" to
-- The apparatus of claim 14, further comprising at least --.

Signed and Sealed this

Seventeenth Day of January, 2006

JON W. DUDAS
*Director of the United States Patent and Trademark Office*